United States Patent [19]

Hanko

[11] Patent Number: 5,627,966

[45] Date of Patent: May 6, 1997

[54] METHOD FOR SIMULATING THE PARALLEL PROCESSING OF VIDEO DATA

[75] Inventor: James G. Hanko, Redwood City, Calif.

[73] Assignee: Sun Microsystems, Inc., Calif.

[21] Appl. No.: 421,478

[22] Filed: Apr. 12, 1995

Related U.S. Application Data

[63] Continuation of Ser. No. 177,285, Jan. 4, 1994, abandoned.

[51] Int. Cl.$^6$ ..................................................... G06F 9/30
[52] U.S. Cl. ........................... 395/185.02; 395/565
[58] Field of Search ............................ 395/185.02, 375

[56] References Cited

U.S. PATENT DOCUMENTS

| | | | |
|---|---|---|---|
| 4,393,468 | 7/1983 | New | 364/736 |
| 4,625,273 | 11/1986 | Woffinden et al. | 395/185.02 |
| 4,860,248 | 8/1989 | Lumelsky | 395/163 |
| 4,909,119 | 3/1990 | Morokuma | 84/702 |
| 4,933,878 | 6/1990 | Gottag et al. | 395/131 |
| 5,093,722 | 3/1992 | Miyaguchi et al. | 348/391 |
| 5,109,480 | 4/1992 | Sone et al. | 395/131 |
| 5,185,856 | 2/1993 | Alcorn et al. | 395/130 |
| 5,228,126 | 7/1993 | Marianetti, II | 395/162 |
| 5,485,583 | 1/1996 | Cunningham et al. | 395/845 |

FOREIGN PATENT DOCUMENTS

| | | |
|---|---|---|
| 485833A3 | 5/1992 | European Pat. Off. . |
| 486143A2 | 5/1992 | European Pat. Off. . |
| 89/05010 | 6/1989 | WIPO . |

OTHER PUBLICATIONS

European Search Report for EPO Application No. EP 94 30 9577 dated Mar. 15, 1995, 2 pgs.

*Primary Examiner*—Krisna Lim
*Attorney, Agent, or Firm*—Blakely Sokoloff Taylor & Zakman LLP

[57] ABSTRACT

A method for simulating multiple instruction launch in a single-scalar computer system is disclosed. A video data signal having a plurality of data components arranged contiguously is reformatted by inserting overflow buffers between the data components such that they are no longer contiguous. The reformatted video data signal may then be operated on by a single instruction because there will be no propagation of a carryover value between contiguous data components. Upon completion of the instruction, the overflow buffers are checked to determine if overflow has occurred. If there has been overflow, overflow compensation is performed. After overflow compensation, or if there was none, the result of the instruction may be placed in an appropriate format for use in a display device.

16 Claims, 8 Drawing Sheets

DISPLAY DEVICE 30

| A  | AB   | B |
| AC | ABCD |   |
| C  |      | D |

METHOD FOR SIMULATING THE PARALLEL PROCESSING OF VIDEO DATA

This is a continuation of application Ser. No. 08/177,285, filed Jan. 4, 1994, now abandoned.

BACKGROUND OF THE INVENTION

1. Field of the Invention

The present invention relates to methods and apparatus for generating images on a cathode ray tube ("CRT") or other display device. More particularly, the present invention relates to a pseudo-superscalar technique for video processing that allows the simultaneous execution of instructions in a single-scalar computer system.

2. Art Background

When processors were first introduced, instructions were launched one at a time. Conversely, the superscalar computer systems of today execute multiple instructions simultaneously by employing multiple instruction paths that allow for launching multiple instructions in parallel. A superscalar computer system determines which instructions may be executed independently, i.e. without a dependency upon another instruction, and then launches those instructions simultaneously. This multiple instruction launch results in significant increase in instruction throughput.

The processing of video data is an area in which multiple instruction launch is most beneficial. Video data may be represented by a 24-bit wide data signal which contains the information associated with a single picture element, or pixel, on a CRT or other display device. There are three 8-bit data components each corresponding to one of three sub-pixels within the pixel. There is a red sub-pixel, a green sub-pixel, and a blue sub-pixel. Typical video data processing operations such as dithering and interpolation require that all three data components in the data signal be operated upon in order to produce a new pixel value for display on the CRT. Operations on the data components often require simple arithmetic operations such as addition and subtraction, which may result in the propagation of a carryover value caused by overflow.

Thus, if the data signal is operated on as a single 24-bit wide value, there can be propagation of a carryover value between the data components. Any carryover value will invalidate the contents of the contiguous data component. Prior art solutions typically require the extraction of individual data components from the data signal and subsequent operation on each data component. In a single-scalar architecture, i.e. an architecture where only one instruction is launched at a time, this results in high processing overhead due to more than trebling the number of instructions required. A superscalar system overcomes this by launching the three sets of instructions simultaneously, completing the three sets of instructions in the time it takes a single-scalar system to complete one set of instructions.

However, despite the increase in performance that superscalar systems offer, the cost of replacing or redesigning a single-scalar system is often prohibitive. Therefore, as will be described, the present invention provides a method and apparatus for simulating multiple instruction launch in a single-scalar system.

SUMMARY OF THE INVENTION

The present invention provides a method and apparatus for simulating multiple instruction launch in a computer system. In the method according to the present invention a data signal is received by a register in the computer system. The data signal comprises a plurality of data components that are arranged contiguously. In order to simulate the simultaneous launching of multiple instructions, the data signal is reformatted such that the data components are no longer arranged contiguously. Instead, each data component is separated from the nearest data component by an overflow buffer. An instruction is then executed using the reformatted data signal as an operand such that at least two data components are simultaneously operated on by the execution of the instruction. The overflow buffers are then checked to determine if overflow has occurred. If a data component has overflowed and the operation is arithmetic addition, overflow compensation is applied to place a largest valid data item in the overflowed data component such that the overflowed data component contains all logical 1's. If a data component has overflowed and the operation is arithmetic subtraction, overflow compensation is applied to place a smallest valid data item in the overflowed data component such that the overflowed data component contains all logical 0's. A result signal is then outputted.

BRIEF DESCRIPTION OF THE DRAWINGS

The objects, features, and advantages of the method and apparatus of the present invention will be apparent from the following detailed description of the invention in which.

DETAILED DESCRIPTION

The method and apparatus disclosed herein simulate the simultaneous launch of multiple instructions by superscalar systems, but the present invention can also be used to enhance the instruction launch capabilities of superscalar processors. The method and apparatus are particularly well-suited for data processing applications in which precision of result may be sacrificed to increase instruction throughput. Thus, video data processing applications are provided as examples of the method and apparatus of the present invention. However, it will be readily apparent to one skilled in the art that the present invention is not confined to the field of video data processing applications.

In many instances, it is appropriate for there to be imprecisions in video data processing due to the fact that the human vision sense is incapable of detecting such imprecisions. Further, there are some instances in which a high resolution image is being translated for use on a low resolution monitoring device. Imprecisions are allowable due to the fact that even if the processing is precise, the low resolution monitoring device is unable to display the added resolution.

Although the present invention is described with reference to specific circuits, block diagrams, signals, algorithms, etc., it will be appreciated by one of ordinary skill in the art that such details are disclosed simply to provide a more thorough understanding of the present invention. It will therefore be apparent to one skilled in the art that the present invention may be practiced without the specific details. In other instances, well known circuits are shown in block diagram form in order not to obscure the present invention unnecessarily.

Figure 1:
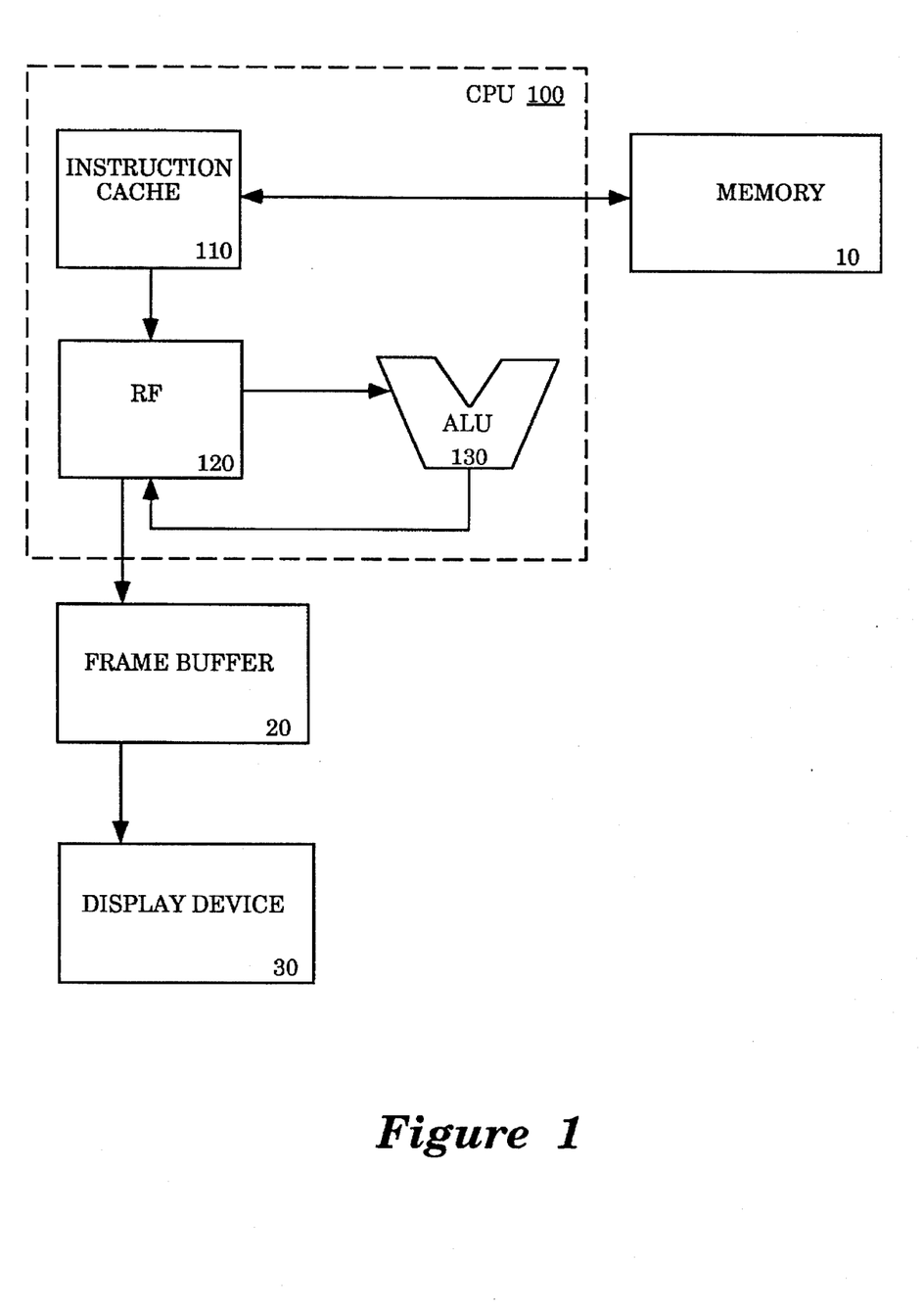
FIG. 1 illustrates a block diagram of a system implementing an embodiment of the present invention.

In FIG. 1, an overall block diagram view of one embodiment of the present invention is shown. In a central processing unit (CPU) 100, an instruction cache 110 fetches an instruction from memory 10 and outputs an instruction signal to the register file (RF) 120. The register file 120 decodes address values contained in the instruction signal and outputs the video data of the addressed registers in a data signal. The data signal is delivered to an arithmetic logic unit (ALU) 130 for execution of the instruction using the data provided. Upon completion of the instruction, the ALU 130 returns the result in the appropriate register of the RF 120. One of ordinary skill in the art will recognize that an instruction execution unit other than an ALU can be used to execute instructions. For example, a floating point execution unit can be used. The CPU 100 outputs the processed video data to a frame buffer 20, from which the image represented by the video data is scanned onto the display device 30.

Figure 2:
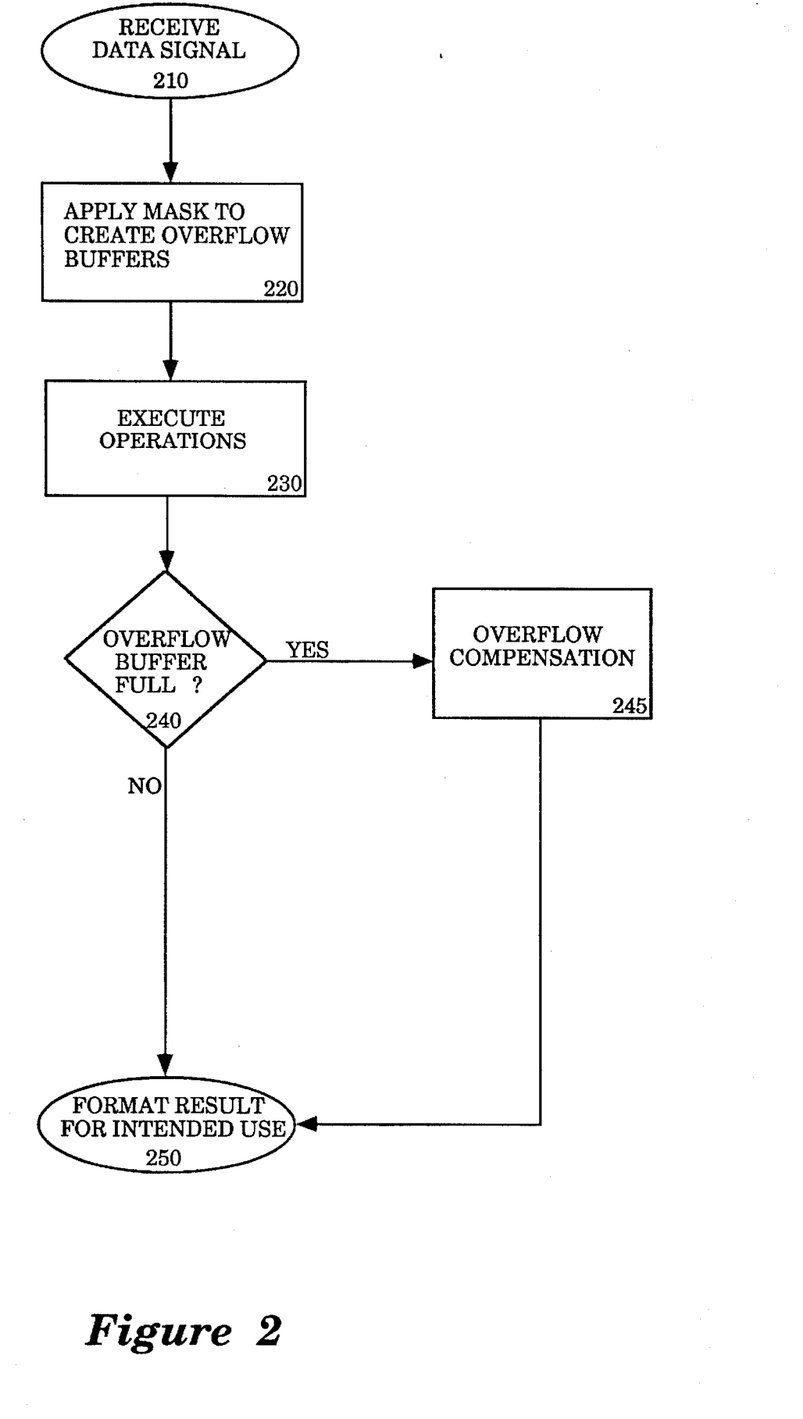
FIG. 2 illustrates a flow diagram of one embodiment of the method of the present invention.
Figure 3:
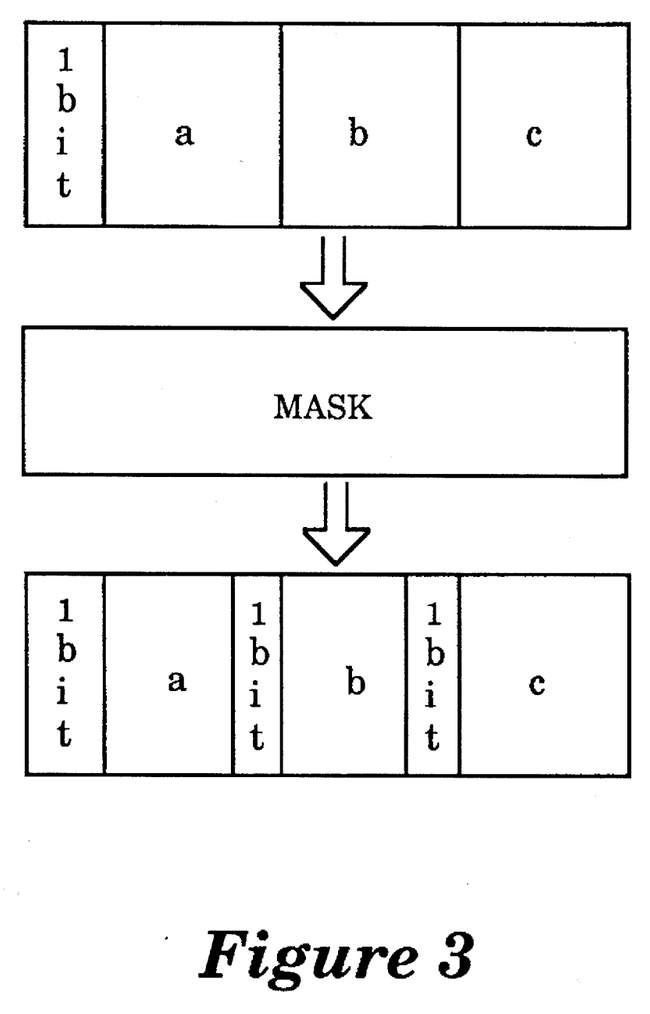
FIG. 3 illustrates the reformatting of a data signal using a mask signal according to the method of the present invention.

FIG. 2 represents a flow diagram according to one embodiment of the method of the present invention. The method illustrated can be implemented in a computer system by a processor. At step 210, a data signal is received by a memory element, which may be a register located, for example, in the ALU of the processor. The data signal is preferably in a format such that the data signal contains a plurality of data components arranged contiguously. For example, if the data is video data, the data may be represented by a 24-bit wide data signal which contains the red, green, and blue information associated with a pixel. The register is preferably wider than the data signal. This is illustrated in FIG. 3. A data signal having data components a, b, and c is stored in a register that is one bit wider than the data signal. If the data is video data, the register is at least 25 bits wide.

Referring again to FIG. 2, after the data signal is received by the register in step 210, a mask is applied at step 220 to the contents of the register and the result is stored in a second register in the register file. The mask may be applied by the ALU or any equivalent instruction execution unit. The mask creates an overflow buffer for each data component of the signal. Overflow buffers are preferably at least one bit wide and are initially assigned a value depending on the type of instruction that is to be performed on the data signal. For example, the bits of the overflow buffers are each initially assigned a value of logical 0 (logic LOW) for an arithmetic addition instruction. Conversely, the bits of the overflow buffers are preferably assigned a value of logical 1 (logic HIGH) for an arithmetic subtraction instruction. The overflow buffers are placed such that the least significant overflow buffer is just to the left of the most significant bit position of the least significant data component. The contiguous data component is not shifted to the left in order to compensate for placement of the overflow buffer. Thus, placement of the overflow buffers may result in some data being lost. However, the data signal is now formatted such that the data components are no longer contiguous. This allows for simultaneous operation on a plurality of data components by a single instruction. FIG. 3 illustrates the contents of the register after applying an exemplary mask signal where the overflow buffers are one bit wide. The a data component and the b data component are truncated by one bit to allow for the overflow buffers.

As will be shown in reference to the examples below, the particular configuration of the mask will be determined by the particular data processing application in which this method is implemented. Preferably, one bit of overflow buffer is provided for every doubling of a value. Further, the system preferably implements registers within the ALU and the register file such that the width of each register exceeds the width of the data signal by at least the width of an overflow buffer for a single data component. The actual width of the overflow buffers in a particular application may be ultimately determined by concerns for precision of result. The use of an overflow mask operates on the principle that, in some instances, precision of result may be sacrificed in order to increase processing speed. This principle is particularly applicable to certain video data processing applications due to the fact that the human vision sense is not capable of detecting small errors in graphical representations. The balancing of precision versus speed is something that is preferably performed on a case-by-case basis, as illustrated by the two embodiments.

Referring to FIG. 2, after the mask is applied in step 220, all arithmetic operations are executed in step 230. Upon completion, at step 240, the overflow buffers are checked to determine whether or not overflow has occurred. If overflow has occurred, then an overflow compensation process is applied in step 245. After overflow compensation, or if there was no overflow, the result is formatted for the intended use in step 250. All of these operations may be done by an ALU.

The operation of this method will now be discussed in relation to two particular embodiments. First, a method for dithering a digital image will be discussed.

Most graphical data is represented in a 24-bit format, with 8-bits allocated for the red, green, and blue components of each pixel (picture element). However, most display devices are of a lower resolution then the 24-bit data representation, displaying only an 8-bit representation of the 24-bit data signal. Thus, most display devices display only a small subset of all colors. To display 24-bit data on 8-bit display device, the 24-bit data signal is truncated by "throwing away" 16-bits worth of data. Unfortunately, this results in a very low quality picture with sudden color changes and loss of detail.

To preserve image quality when displaying on a lower resolution display device, the process of dithering is used. Dithering is a technique which permits the simulation of intensity levels between quantized levels by using the properties of the human eye to integrate fine detail within an area and record only the overall intensity of the area. Dithering aims to sacrifice some of an image's spatial resolution for an increase in perceived intensity resolution, accomplished by varying the intensities of several neighboring pixels to simulate intensities that lay between quantization levels. Typically, this technique works well, since the eye naturally blends individual pixel values such that only the average intensity in the surrounding area or neighborhood is perceived.

In dithering, a noise component is added to each data component of the signal. As discussed above, the red, green, and blue components have typically been operated on in a sequential manner. For example, if the red sub-pixel data component is operated on first, the red has a dither noise component added to it. The green data component is then similarly processed, followed by processing of the blue data component. Alternatively, lookup tables are used to perform a similar function.

Because only a single addition operation is being performed on each data component, an overflow buffer having a buffer width of 1-bit is sufficient. This is because adding the data component to the noise component can result in doubling the value of the data component only once, which results in an overflow of 1-bit. A mask signal is therefore chosen in order to create three overflow buffers having a buffer width of one bit. This may be done by performing a logical AND operation between the 24-bit data signal and the mask signal, where each overflow buffer position within the mask signal will be indicated by a 0 and all other bits will contain a 1, or a logical high value.

Figure 4:
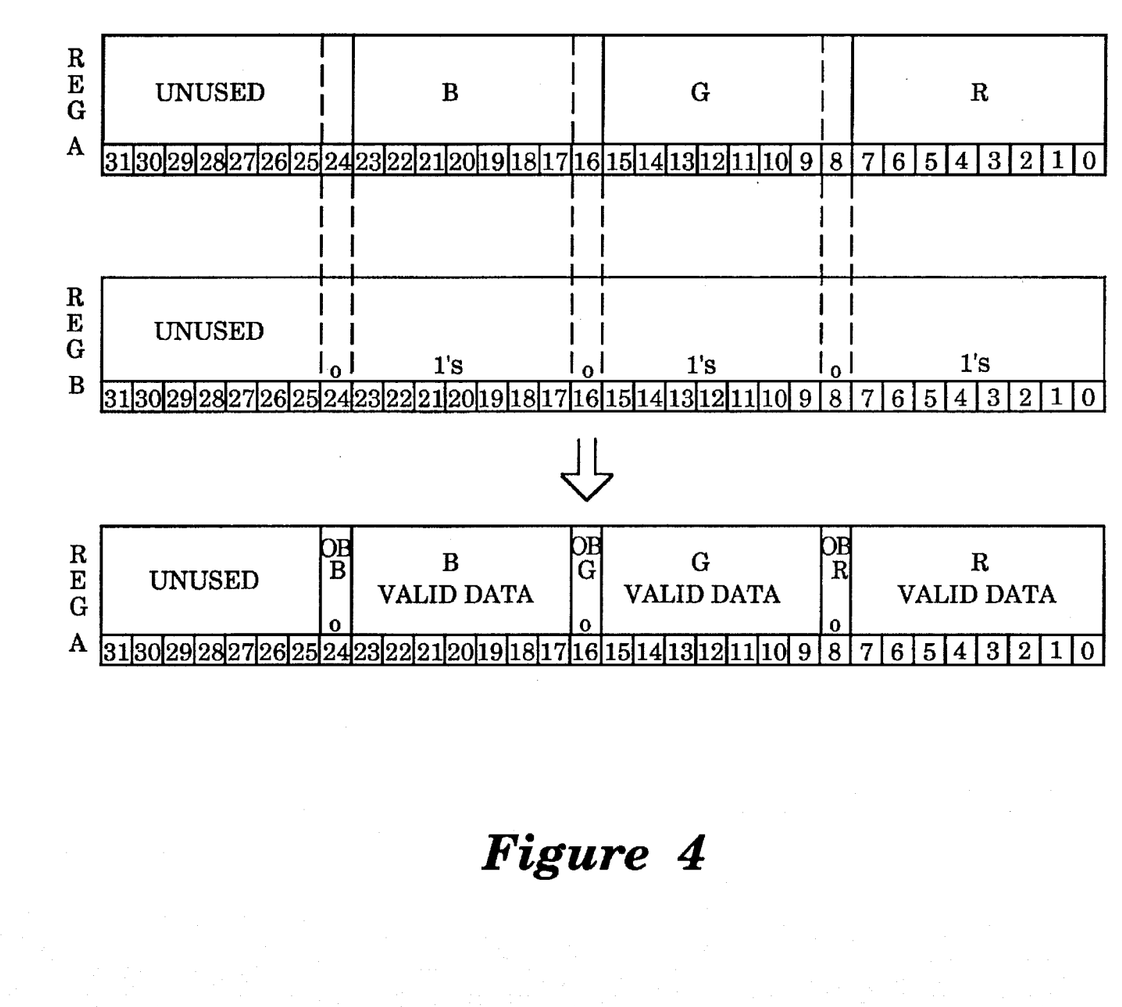
FIG. 4 illustrates the reformatting of a video data signal using a mask signal in order to perform dithering according to the method of the present invention.

For example, referring to FIG. 4, the data signal is received by a register A, which may be located in the ALU of the processor. The red data component occupies bit positions 0–7, the green data component occupies bit positions 8–15, and the blue data component occupies the bit positions 16–23. Bit positions 24–31 are unused. The mask signal located in register B is such that an overflow buffer is placed at each of the bit positions 8, 16, and 24. The result of the mask operation using Register A and Register B is a reformatting of the data components such that the data components are no longer contiguous. The masking process leaves data of the red data component completely intact, but the green data component and the blue data component are each truncated to 7-bit data representations. The truncated bit of the green data component at bit position 8 is now used as the overflow buffer for the red data component. Similarly, the truncated bit of the blue data at bit position 16 is now used as the overflow buffer of the green data component. The overflow buffer for the blue data component is at bit position 24. By providing the overflow buffers, the execution of an arithmetic add operation cannot cause the propagation of a carry over value between data components.

For a subtraction operation, the process of creating overflow buffers is slightly different. First, the mask signal contains a 1 in each overflow buffer and 0's in all other bit positions. Second, the overflow buffers are created by performing a logical OR operation using the 24-bit data signal and the mask signal as operands. This places 1's in the overflow buffers. Overflow is detected when an overflow buffer is found to contain a 0. The differences in the process for subtraction are a result of the fact that overflow during a subtraction operation occurs when the operation inappropriately "borrows" from the adjacent data component.

Returning to the dithering process, which implements an arithmetic addition operation, if overflow occurs, the bit of the overflow buffer is set to logical 1 (logic HIGH). The executed signal is checked for overflow, and, if any of the overflow buffers contains a bit set to logical 1, overflow compensation occurs. Checking for overflow can be implemented by simply performing a logical AND operation between the result of the executed arithmetic add and an inverted mask, wherein a logical 1 is placed in all bit positions containing an overflow buffer, and all other bit positions contain a logical 0. If the result of the logical AND operation is not equal to 0, overflow compensation is undertaken in order to place the largest valid data item in the overflowed data component. The largest valid data item corresponds to setting all bits in the overflowed data component to logical 1's.

Figure 5:
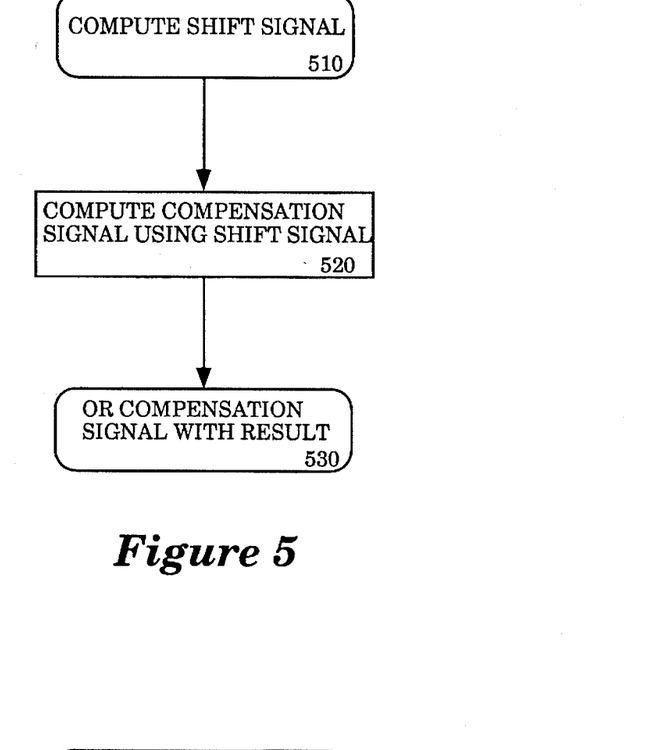
FIG. 5 illustrates one method for overflow compensation when a single arithmetic addition operation is executed.

FIG. 5 illustrates one method for performing overflow compensation when the result is computed using a single arithmetic addition operation, as occurs in the exemplary dithering process. In this example, the largest valid data item is placed in the overflowed data component by shifting the value of the result of the second logical AND operation to the right by 7 bit positions (step 510) and subtracting the shifted value from the inverted mask signal in order to produce a compensation signal (step 520). A logical OR operation is then performed at step 530 using the compensation signal and the result of the arithmetic addition operation. The overflowed data component contains the largest valid data item and the contents of the remaining data components are unaffected by the overflow compensation operation. It should be noted that several overflowed data components can be operated on simultaneously using this method. Whether or not overflow compensation is required, the final result is preferably formatted into the requisite format required by the particular application. For example, in the present illustration, the dithered 24-bit signal is truncated to an 8-bit representation so that it can be displayed on the low resolution display device. It should be noted that number of bit positions shifted is preferably equal to the number of bit positions in a truncated data component.

Figure 6:
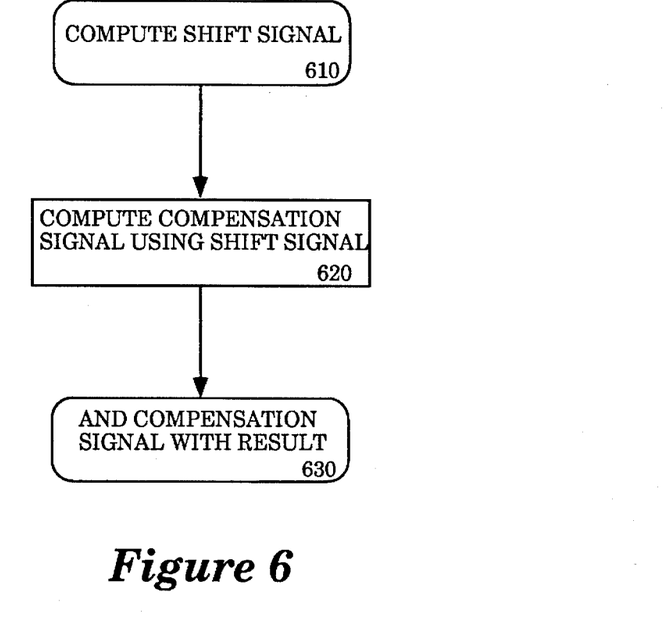
FIG. 6 illustrates one method for overflow compensation when a single arithmetic subtraction operation is executed.

FIG. 6 illustrates one method for performing overflow compensation when the result is computed using a single arithmetic subtraction operation. Again, if an arithmetic subtraction operation is executed, the process of overflow compensation is different. First, overflow is detected if an overflow buffer contains a logical 0 (not shown). Overflow may be detected by performing a logical AND operation between the result of the subtraction operation and a mask signal that contains logical 1's in the overflow buffers and logical 0's in all other bit positions. This mask signal is equivalent to the inverted mask for the addition operation. If overflow is detected, overflow compensation is implemented in order to place a smallest valid data item in the overflowed data component. The smallest valid data item sets all of the bits in the overflowed data component to logical 0's. The smallest valid data item is placed in the overflowed data component by shifting the result of the overflow detecting AND operation to the right by the specified number of bit positions (step 610) and subtracting the shifted signal from a mask signal equivalent to the inverted mask signal for the addition operation in order to produce a compensation signal (step 620). A logical AND operation is then performed at step 630 using the result of the arithmetic subtraction operation and the compensation signal. The overflowed data components contain the smallest valid data item and the contents of the remaining data components are unaffected by the overflow compensation operation.

Figure 7:
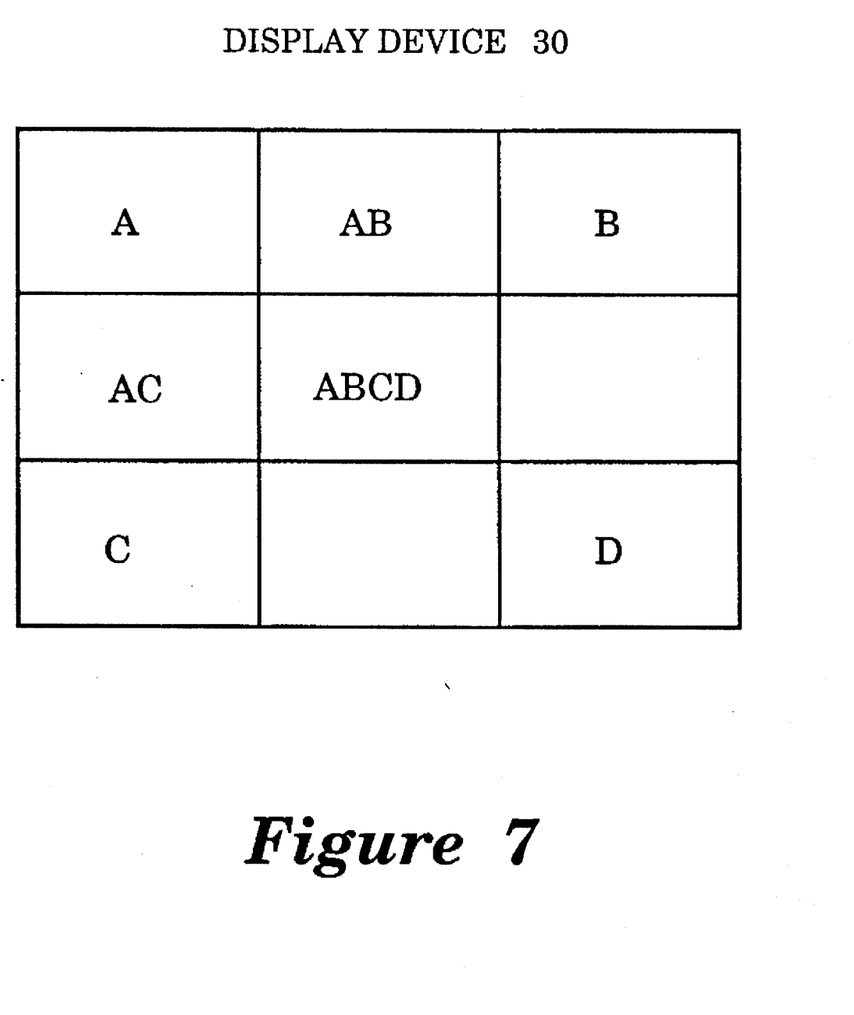
FIG. 7 illustrates an arrangement of pixels after interpolation.

Another example of the system and method of the present invention is applicable is the application of image interpolation. The interpolation process is used to expand graphical and video data to a larger size. In the case of expansion by a factor of two, new pixel values are synthesized by taking the average of the surrounding original pixels. The averaging process is preferably performed independently for the red, green, and blue components. For example, the pixels are arranged in a grid on the display device 30 as shown in FIG. 7. Referring to FIG. 7, pixels A, B, C, and D are the pixels to which are assigned the original pixel values of A, B, C, and D. The pixels labeled AC, AB, and ABCD, are pixels whose brightness correspond to the average values of A and C, A and B, and A, B, C, and D, respectively. The pixels without labels are computed in a subsequent iteration of the method.

One prior art method for performing this operation required extracting the individual sub pixel values from each of the pixel values A, B, C, and D. First, the red components are extracted. The arithmetic average of Ared and Bred was taken to yield ABred. Then, the average of Ared and Cred was taken to yield ACred. Finally, the average of Ared, Bred, Cred, and Dred was taken to yield ABCDred. The computation of the green and blue components followed in a similar manner. In the present invention, the method of FIG. 2 may be applied in order to greatly increase the speed of computation.

Figure 8:
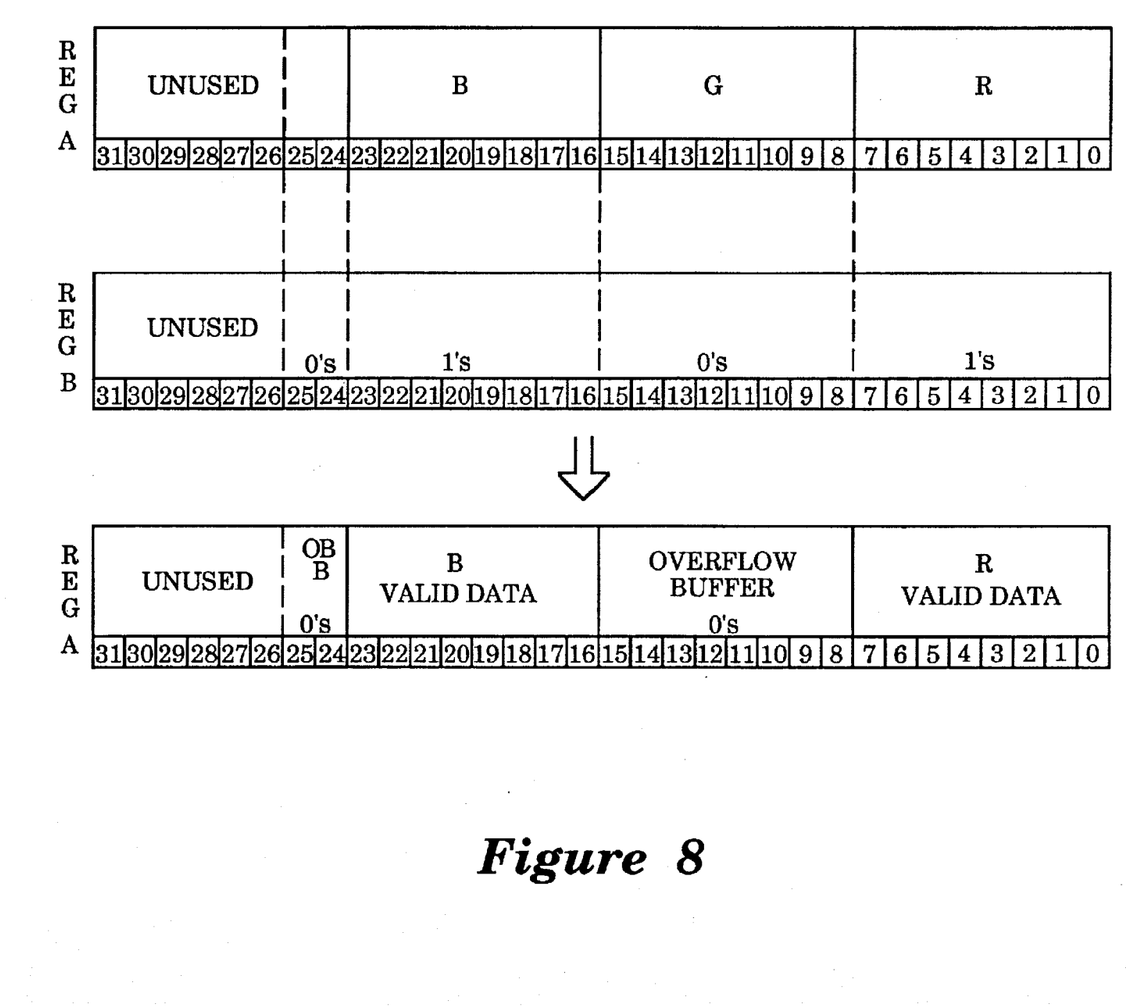
FIG. 8 illustrates the application of a red and blue mask to a video data signal to perform interpolation according to the method of the present invention.
Figure 9:
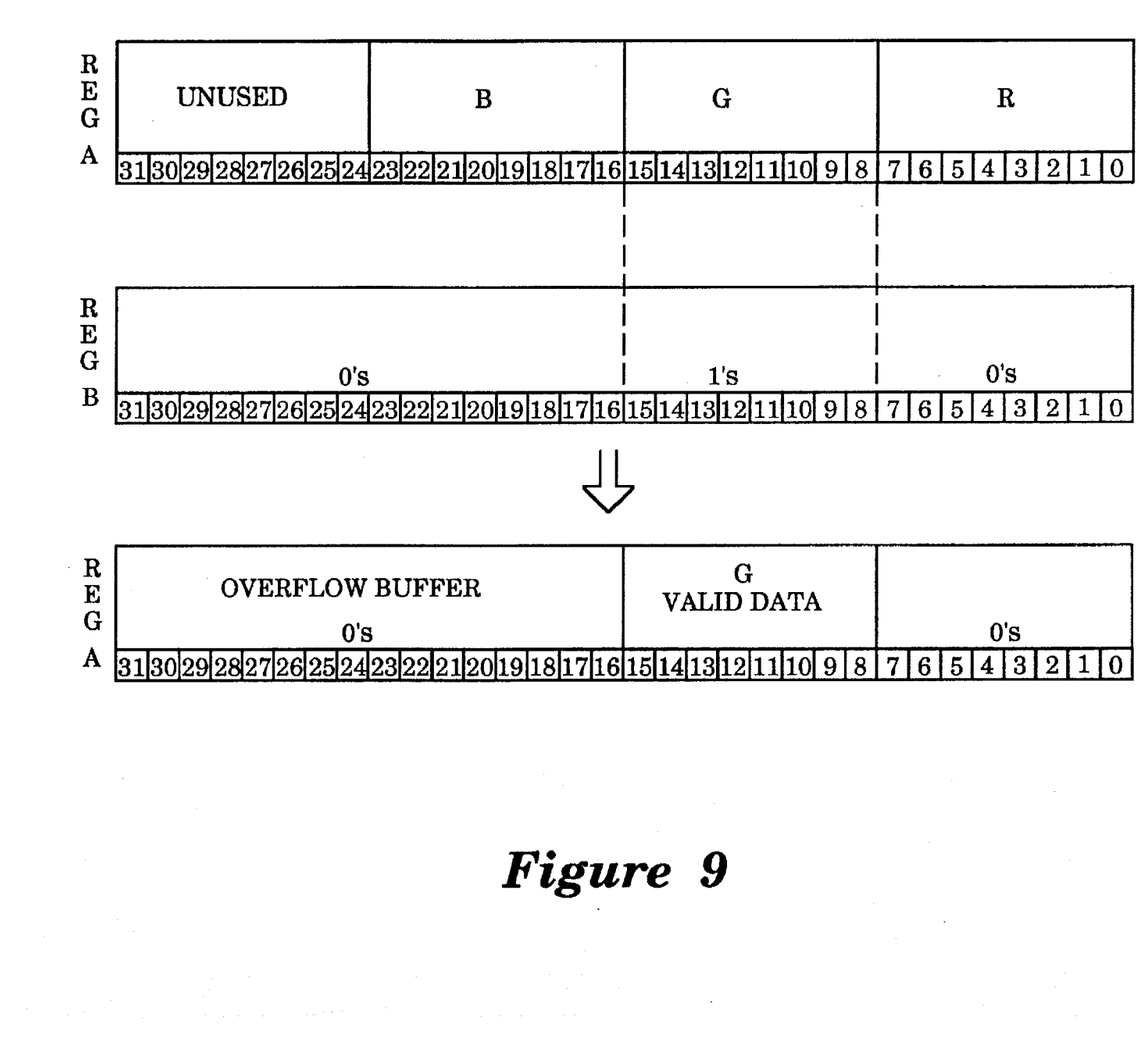
FIG. 9 illustrates the application of a green mask to a video data signal to perform interpolation according to the method of the present invention.

Interpolation requires the addition of four pixel values. Therefore, the overflow buffer are preferably at least two bits wide. If the data signal is in the aforementioned 24-bit wide format, the separation of the data components by 2-bit overflow can become too expensive because an error of 2-bits may be detected by the human vision sense. Therefore, an alternative masking process is used for the interpolation process. Two mask signals are used in this example: a green mask that provides for sole operation on the green components, and a red and blue mask that allows for simultaneous operation on the red and blue data components. Thus, as illustrated in FIG. 8, applying the red and blue mask to the contents of Register A results in an 8-bit wide overflow buffer for the red data component. Applying the green mask to the contents of Register A results in a 16-bit wide overflow buffer for the green component, as shown in FIG. 9. The masks are applied to the 24-bit data representations of each of the four pixels, A, B, C, and D. Then, the values AB, AC, and ABCD can be computed using the masked values. Because the operations on the red and blue components are done simultaneously, instruction throughput is increased. In this particular application, there is no need for overflow compensation because after the numbers are added together they are divided by two, in the case of AB and AC, or divided by four, in the case of ABCD.

While the invention has been described in conjunction with the preferred embodiments, it is evident that numerous alternatives, modifications, variations and uses will be apparent to those skilled in the art in light of the foregoing description. In particular, although the invention has been described in detail with respect to the video data processing techniques of dithering and interpolation, the invention may be utilized in any data processing where data is represented as a plurality of values and especially where precision of result may be sacrificed for speed of processing.

What is claimed is:

1. In a computer system, a method for simulating multiple instruction launch comprising the steps of:

executing at least one instruction using a data signal as an operand to produce a result signal, wherein the data signal comprises a plurality of data components that are each separated from a nearest data component by an overflow component at a first predetermined set of one or more bit locations such that at least two data components are operated on simultaneously by the execution of the instruction, and wherein the result signal includes a plurality of data components and overflow components at a second set of predetermined bit locations corresponding to said first set of predetermined bit locations of the overflow components in said data signal;

checking each overflow component of the result signal to determine if overflow has occurred; and applying overflow compensation to the plurality of data components in the result signal if overflow is detected in the step of checking, wherein overflow compensation is performed simultaneously for the plurality of data components of the result signal to generate a compensated result signal.

2. The method according to claim 1 wherein the method is used in a dithering operation for video data processing.

3. The method according to claim 1 wherein the method is used in an interpolation operation for video data processing.

4. The method according to claim 1 wherein the step of checking further comprises the steps of:

providing a mask signal;

performing a logical AND operation using the result signal and the mask signal as operands; and outputting a check signal.

5. The method according to claim 4 wherein the step of applying overflow compensation to the result signal comprises the steps of:

shifting data of the check signal by a number of bit positions to output a shift signal; and subtracting the shift signal from the mask signal to output a compensation signal.

6. The method according to claim 5 wherein the instruction is an arithmetic addition operation, the step of applying overflow compensation comprising the step of:

performing a logical OR operation using the compensation signal and the result signal as operands such that a largest valid data item is placed in each overflowed data component of the result signal.

7. The method according to claim 5 wherein the step of applying overflow compensation to the result signal further comprising the step of:

performing a logical AND operation using the compensation signal and the result signal as operands such that a smallest valid data item is placed in each overflowed data component.

8. A machine readable medium having stored thereon data representing sequences of instructions, which when executed by a computer system, cause said computer system to perform the steps of:

simultaneously performing an arithmetic operation on each of a first data component and a second data component of an input data signal to generate a result data signal, the first and the second data component of the input data signal being separated by an overflow component, said first and second data components in said result data signal each having a highest order bit, said result data signal including a first overflow component adjacent to the highest order bit on said first data component of said result data signal; and altering said first data component of said result data signal to compensate for overflow that resulted when said arithmetic operation was performed on said first data component of said input data signal.

9. The machine readable medium of claim 8, wherein the step of altering said first data component includes the steps of:

checking said first overflow component in said result data signal; and detecting, based on said step of checking, that performing said arithmetic operation on said first data component resulted in an overflow.

10. The machine readable medium of claim 8, wherein:

said result data signal includes a second overflow component adjacent to the highest order bit of said second data component of said result data signal; and said sequence of instructions, which when executed by said computer system, additionally cause said computer system to perform the step of:

altering said second data component in said result data signal to compensate for an overflow that resulted when said arithmetic operation was performed on said second data component of said input data signal.

11. The machine readable medium of claim 10, wherein said step of altering said first data component and said step of altering said second data component are performed simultaneously.

12. The machine readable medium according to claim 8 wherein said step of altering said first data component of said result data signal includes the step of: placing one of a largest valid data item and a smallest valid data item in said first data component of said result data signal.

13. The machine readable medium according to claim 10 wherein said step of altering said first data component of said result data signal includes the step of:

placing one of a largest valid data item and a smallest valid data item in said first data component of said result data signal.

14. A machine readable medium having stored thereon data representing sequences of instructions, which when executed by a computer system, cause said computer system to perform the steps of:

performing an arithmetic operation on each of a plurality of data components of an input data signal to generate a result data signal having a plurality of data components, each data component of said input data signal being separated by an overflow component, each data component of said result data signal having a highest order bit, said result data signal including an overflow component adjacent to the highest order bit of each data component of said plurality of data components;

detecting which of said arithmetic operations on said plurality of data components in said input data signal resulted in an overflow; and simultaneously altering at least two data components of said plurality of data components in said result data signal that overflowed.

15. The machine readable medium according to claim 14 wherein said step of simultaneously altering at least two data components includes the step of:

placing one of a largest valid data item and a smallest valid data item in said at least two data components of said result data signal.

16. The machine readable medium of claim 14, wherein the step of detecting which of said arithmetic operations on said plurality of data components in said input data signal resulted in an overflow includes the step of:

checking said overflow components in said result data signal; and detecting, based on said step of checking, which of said arithmetic operations on said plurality of data components in said input data signal resulted in an overflow.

* * * * *